J. H. JOHNSON.
BALL COCK.
APPLICATION FILED JUNE 29, 1912.
1,159,499.
Patented Nov. 9, 1915.
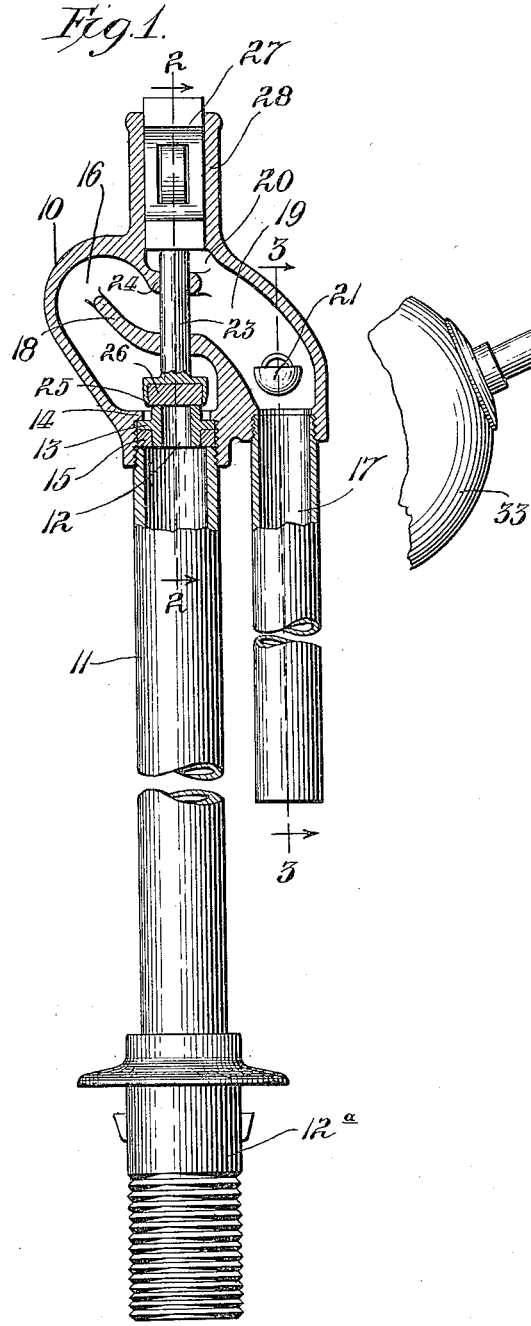
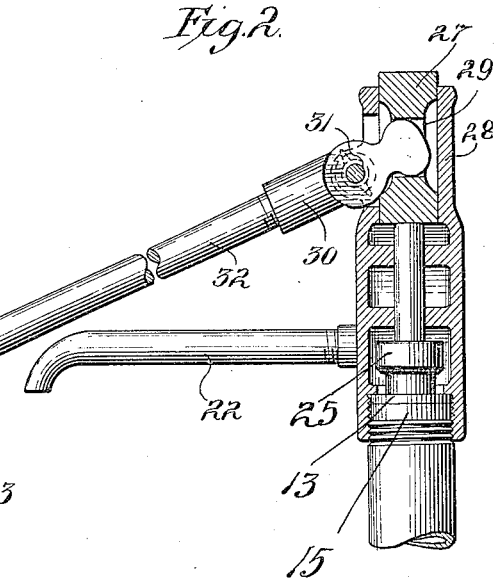
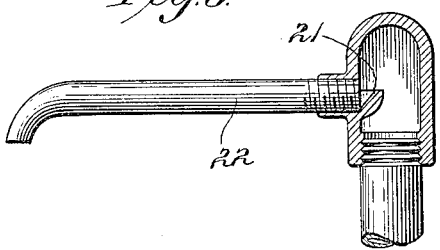
Witnesses:
Harry S. Gaither
J. V. Curran
Inventor:
John H. Johnson
by Wallace R. Lane
Atty's
COLUMBIA PLANOGRAPH CO., WASHINGTON, D. C.

UNITED STATES PATENT OFFICE.

JOHN H. JOHNSON, OF CHICAGO, ILLINOIS, ASSIGNOR TO FEDERAL HUBER COMPANY, A CORPORATION OF ILLINOIS.

BALL-COCK.

1,159,499.   Specification of Letters Patent.   Patented Nov. 9, 1915.

Application filed June 29, 1912. Serial No. 706,602.

*To all whom it may concern:*

Be it known that I, JOHN H. JOHNSON, a citizen of the United States, residing at Chicago, in the county of Cook and State of Illinois, have invented new and useful Improvements in Ball-Cocks, of which the following is a specification.

The present invention is a ball cock or float valve of such construction that it may be used with advantage for the purpose of controlling the flow of water to the flushing tanks of water closets and for similar purposes.

It is the object of the present invention to provide a ball cock which can be removed easily from the tank for adjustment or repairs and particularly without withdrawing the water from the tank.

It is the further object to provide a ball cock which will permit the tank to fill rapidly and which will give a quick and substantially noiseless closing of the valve to check the incoming water, and which has its valve and valve seat so constructed and adjusted that the wearing parts will be preserved, but with ample opportunity for renewal in case of wear through long use.

It is a further object to provide a valve chamber and water passages so disposed that a packing is unnecessary at the top end of the valve, and more particularly to provide a constriction in the water channel which, by increasing the velocity of the moving water, produces a suction at the top of the fitting where a packing has heretofore ordinarily been necessary.

It is a further object of the invention to provide the valve cock with an outlet of large dimensions, fitting the valve chamber with an inwardly projecting ledge or cup to divert some of the passing water outwardly for reëstablishing the water seal in the bowl of the closet whereon this valve cock is in use.

One embodiment of my present invention is disclosed in detail in the following description which is to be taken in conjunction with the accompanying drawings wherein—

Figure 1 is an elevation of the ball cock partly in section, Fig. 2 is a transverse section on the lines 2—2 of Fig. 1, Fig. 3 is a transverse section on the lines 3—3 of Fig. 1, and Fig. 4 is a perspective view of the reversible valve seat.

In the construction shown, the valve casing 10 is screwed to the top of the inlet pipe 11, the lower end of which may be securely attached to the shank $12^a$ whereby the water connection is established at the bottom of the water tank. This water tank may be of the narrow and low type and the inlet pipe 11 may be in the nature of a permanent fixture within the tank but carrying on its upper end the removable elements of the ball cock.

Interposed between the valve casing 10 and the upper smooth edge of the inlet pipe 11 is a valve seat 12 of cylindrical outline with an annular ledge or flange 13 adapted to engage with an annular flange 14 in the valve casing and separated from the upper smooth edge of pipe 11 by a leather or rubber washer or gasket 15. The valve seat presents a smooth annular surface to the valve and is reversible to present to the valve a new wearing surface in case of damage or wear after long use. The packing 15 insures a water tight connection at the top of pipe 11 and facilitates the easy unscrewing of the valve casing for purposes of examination or repair as hereinbefore set forth.

The valve casing is preferably a single casting of brass or the like, having a water duct or passage leading from valve seat 12 upward to a reverse bend 16 at one side of the valve casing and then in a downwardly direction to the outlet pipe 17. The water passage is of wide cross section near the valve but narrows down so that at the reverse bend 16 it is materially constricted. As the result, water passing the valve is held back by the constriction at 16 so that it attains a high velocity and jets downward along the top curved face of the partition 18 with such speed that when delivered into the enlargement 19 of the valve casing, it sets up a suction at the duct 20 which communicates with the upper end of the valve casing. It is not necessary that there be a material suction at the point 20 so long as there is at that point no pressure sufficient to deliver water upward around the loosely fitting upper parts of the valve. It will be understood that the delivery pipe 17 should be relatively large, preferably much larger than has been the common practice, so that water after it passes the constriction at 16 will find a quick and easy exit through pipe 17 to the tank to be filled and will not back up to develop a pressure at 20.

Within the valve casing and directly in the path of water passing from the fitting is a projecting cup or deflector 21 hollowed out to divert some of the passing water outwardly to a side spout 22 which has a down turned end for delivering the water thus diverted through the flushing valve of the water closet into the bowl where it replenishes the water seal after each flushing of the bowl.

The valve with which the valve casing is equipped comprises a cylindrical valve stem 23 passing with a loose fit through the curved partition 18 which separates the intake and outlet ducts of the valve casing and also passing with a loose fit through a barrier 24 separating the water channel from the upper end of the valve casing. At the lower end of the valve stem 23 is an integral cup of cylindrical outline having its depending rim 25 spun inward to grip and hold a thick packing disk 26 of rubber or leather which disk is adapted to seat on the smooth annular upper edge of the valve seat 12 and moves to and from said seat with a straight up and down motion. In case of wear at the valve due to sand in the water, or the like, a renewal of the packing member 26 is made by substituting a complete new member including the valve stem. By making the valve in this way, it is cheap and economical to renew and is free from screws and bolts and other small parts which might become detached to the damage of the valve or to the inconvenience of the user.

The mechanism whereby the valve is opened and closed comprises a cylindrical bearing block 27 fitting loosely within a cylindrical projection 28 at the top of the valve casing and having its lower face resting on the top of valve stem 23. This cylindrical block 27 need not make a water tight connection with its inclosing cylinder and need not be provided with packing rings or the other adjuncts which have been commonly used at this point in valve cocks. By virtue of its loose fit in the casing the block is easily movable and can be shifted as desired through the agency of a relatively small floating ball and a very simple lever connection.

I prefer to provide the block 27 with a transverse recess 29 as shown in Fig. 2 to form bearing surfaces for the inwardly projecting and rounded end of an actuating lever comprising block 30 pivotally mounted on a thumb screw 31 which passes through projecting ears on the side of the retaining cylinder 28. A rod or tube 32 screwed into this block and carrying at its outer end a float ball 33 may be used to raise or lower the sliding block 27 in accordance with the needs of the tank in which the valve cock is mounted. It will be understood that when the flushing valve of the tank is opened to flush the bowl of the closet the float ball 33 will drop, thereby opening the valve and allowing water from pipe 11 to pass upward through the valve fitting and then outward through discharge pipe 17 into the tank which immediately begins to fill, some of the water, however, being diverted through pipe 22 and past the flushing valve in the usual manner to refill the water seal of the closet during the time the flushing tank is filling up. The valve cock does not begin to shut off the incoming water until the tank is nearly full, for the sliding block 27, by virtue of the absence of packing, moves so easily that only a small leverage is necessary between the floating ball and the block and consequently the necessary movement of the valve stem 23 can be produced with a relatively short movement of the floating ball 33. This means that the water tank can be allowed to fill very rapidly until almost full and then quickly shut off with a minimum of noise at the valve.

When the valve cock is to be taken from the tank for examination or repair, pipe 22 is unscrewed and the float valve 33 and its supporting rod 32 are detached either by unscrewing from block 30 or by removal of the threaded supporting pivot 31 and then the fitting 10 is unscrewed from the top of pipe 11. By virtue of the leather packing 15 at the smooth upper edge of pipe 11 this unscrewing operation can ordinarily be effected by hand and without the aid of wrenches and can always be effected without disturbing the stand pipe 11 and without drawing off the small amount of water which ordinarily remains in a tank even though the flushing valve be open. After removing the valve casing 10 from pipe 11, its valve seat 12 can be slipped out for re-surfacing or for reversal and its valve can be withdrawn for examination or renewal.

I am aware that various features of the embodiment disclosed herein may be changed without departing from the spirit of my invention and I do not wish to be limited to the exact construction shown except in so far as the appended claims may indicate.

What I claim as new and desire to secure by Letters Patent of the United States, is:

1. In a ball cock, a casing having a cylindrical bore at its upper end, a sliding block loosely movable within said bore, a valve at the lower end of said casing, a valve stem associated with said valve and projecting up to contact with said sliding block, the said casing having two transverse partitions serving as bearings for the valve stem and forming a water channel, one of the said partitions projecting within the casing to form a restricted opening in the water channel, and the other said partition adapted to deflect the water coming from said restricted opening from the said cylindrical bore.

2. In a ball cock, a valve casing consisting of a single casting having a valve seat, a valve coöperating with said seat and having a valve stem fitting loosely in the upper part of said casting, said casting having a water duct leading from said valve seat upward and having a reverse bend at one side of the valve casing and then leading in a downward direction to the outlet of said casing, said water passage being of wide cross-section near the valve but narrowed at the reverse bend to form a constriction whereby water after passing the valve will be held back by the constriction and ultimately liberated at high velocity so that it will jet downward to the outlet and will set up a suction around the loosely fitting upper parts of the valve.

3. In a ball cock, a casing having an inlet water passage extending upward in one direction, a constriction at the top of said passage, an outlet passage from said constriction extending downward and in the opposite direction into an enlargement assuring a free outflow of water, a chamber above said outlet passage, a communication to said chamber from said outlet passage opening in the direction of the outflowing water, a valve controlling the inlet end of said inlet passage, a block slidingly mounted at the top of said casing to operate said valve, said upper chamber operating to protect said block from water pressure, and a valve stem connecting said block to said valve.

4. A device of the character described, comprising a valve casing having a water channel formed therein, a pair of oppositely disposed partitions extending within said channel way to form a reverse bend, an inlet and outlet communicating with said water channel, the said outlet being provided with an opening of greater diameter than the inlet, one of the said partitions being projected laterally and upwardly within the casing and forming a restricted opening within the water channel of the same diameter as that of the inlet, the upper end of the said casing having a cylindrical bore formed therein, a block movable within said bore, a valve stem projecting through said partitions and in contact with said sliding block, a valve carried by said valve stem and operatively mounted within the inlet and the other said partition adapted to deflect the water from the cylindrical bore as it flows from the said restricted opening formed within the water channel substantially as and for the purpose specified.

In witness whereof, I hereunto subscribe my name to this specification in the presence of two witnesses.

JOHN H. JOHNSON.

Witnesses:
JOSEPH F. CARROLL,
D. A. RAYMOND.

Copies of this patent may be obtained for five cents each, by addressing the "Commissioner of Patents, Washington, D. C."